US008683261B2

(12) United States Patent
Cremer et al.

(10) Patent No.: US 8,683,261 B2
(45) Date of Patent: Mar. 25, 2014

(54) OUT OF ORDER MILLICODE CONTROL OPERATION

(75) Inventors: Michael Cremer, Leonberg-Hofingen (DE); Guenter Gerwig, Simmozheim (DE); Frank Lehnert, Schoenbuch (DE); Peter Probst, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/186,953

(22) Filed: Jul. 20, 2011

(65) Prior Publication Data

US 2013/0024725 A1 Jan. 24, 2013

(51) Int. Cl.
*G06F 11/00* (2006.01)

(52) U.S. Cl.
USPC .......................................... 714/15; 714/6.12

(58) Field of Classification Search
USPC ................... 714/15, 16, 2, 6.12, 20
See application file for complete search history.

(56) References Cited

U.S. PATENT DOCUMENTS

| | | | |
|---|---|---|---|
| 5,581,719 A | | 12/1996 | Steely, Jr. et al. |
| 5,713,035 A | | 1/1998 | Farrell et al. |
| 5,784,587 A | * | 7/1998 | Lotz et al. ................ 712/216 |
| 5,923,862 A | | 7/1999 | Nguyen et al. |
| 6,092,175 A | | 7/2000 | Levy et al. |
| 6,131,157 A | | 10/2000 | Wang et al. |
| 6,671,793 B1 | * | 12/2003 | Swaney et al. ................ 712/34 |
| 7,506,139 B2 | | 3/2009 | Burky et al. |
| 7,555,634 B1 | | 6/2009 | Thatipelli et al. |
| 7,739,482 B2 | | 6/2010 | Nguyen et al. |
| 7,802,074 B2 | | 9/2010 | Garg et al. |
| 2009/0216966 A1 | * | 8/2009 | Shum et al. ................ 711/155 |
| 2010/0153690 A1 | | 6/2010 | Vick et al. |
| 2010/0293347 A1 | | 11/2010 | Luttrell |

OTHER PUBLICATIONS

Webb, C.F., et al., "A High-Frequency Custom CMOS S/390 Microprocessor," IBM Journal of Research and Development, Jul. 1997, vol. 41, Issue 4/5, pp. 463-463, ISSN: 0018-8646.
Shum, C., et al., "Design and Microarchitecture of the IBM System z10 Microprocessor," IBM Journal of Research and Development, Jan. 2009, vol. 53, Issue 1; p. 1, ISSN: 0018-8646.
Search report dated Oct. 8, 2012 received for patent application No. GB1210965.8.

* cited by examiner

*Primary Examiner* — Dieu-Minh Le
(74) *Attorney, Agent, or Firm* — Fleit Gibbons Gutman Bongini & Bianco PL; Thomas Grzesik (57) ABSTRACT

Instructions within a processor are managed by receiving, at a recovery unit of the processor, an instruction that modifies a control register residing within the recovery unit. The recovery unit receives a first set of data associated with the instruction from a general register. A second set of data associated with the instruction is retrieved from the control register by the recovery unit. The recovery unit performs at least one binary logic operation on the first set of data and the second data.

20 Claims, 9 Drawing Sheets

OUT OF ORDER MILLICODE CONTROL OPERATION

FIELD OF THE INVENTION

The present invention generally relates to microprocessors, and more particularly relates to managing out-of-order execution of complex instructions.

BACKGROUND OF THE INVENTION

Modern electronic computing systems, such as microprocessor systems, typically include a processor and datapath configured to receive and process instructions. Generally, instructions are either "simple" or "complex". Typical simple instructions encompass a single operation, such as, for example, a load or store from memory. Common Reduced Instruction Set Computers (RISC) employ simple instructions exclusively. Complex instructions typically encompass more than one single operation, such as an add/store, for example. Common Complex Instruction Set Computers (CISC) employ complex instructions and sometimes also employ simple instructions.

These modern processor cores utilize various techniques to increase performance. One such technique is parallel instruction execution. For example, a fixed-point unit instruction and a binary-floating-point unit instruction, among others, can be executed in parallel in different execution units. This can be superscalar or even out-of-order for "simple" type instructions. However, the complex instructions utilized by architectures such as the CISC architecture are generally required to be executed in millicode. This requirement of being executed in millicode makes parallel and out-of-order execution of these complex instructions difficult, if not impossible.

SUMMARY OF THE INVENTION

In one embodiment, a method for managing instructions within a processor is disclosed. The method comprises receiving, at a recovery unit of the processor, an instruction that modifies a control register residing within the recovery unit. The recovery unit receives a first set of data associated with the instruction from a general register. A second set of data associated with the instruction is retrieved from the control register by the recovery unit. The recovery unit performs at least one binary logic operation on the first set of data and the second data.

In another embodiment, an information processing system comprising a recovery unit for managing instructions within a processor is disclosed. The information processing system comprises memory and a processor communicatively coupled to the memory. The processor comprises a recovery unit configured to perform a method. The method comprises receiving an instruction that modifies a control register residing within the recovery unit. The recovery unit receives a first set of data associated with the instruction from a general register. A second set of data associated with the instruction is retrieved from the control register by the recovery unit. The recovery unit performs at least one binary logic operation on the first set of data and the second data.

In yet another embodiment, a computer program product for managing instructions within a processor is disclosed. The computer program product comprises a storage medium readable by a processing circuit and storing instructions for execution by the processing circuit for performing a method. The method comprises receiving, at a recovery unit of the processor, an instruction that modifies a control register residing within the recovery unit. The recovery unit receives a first set of data associated with the instruction from a general register. A second set of data associated with the instruction is retrieved from the control register by the recovery unit. The recovery unit performs at least one binary logic operation on the first set of data and the second data.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
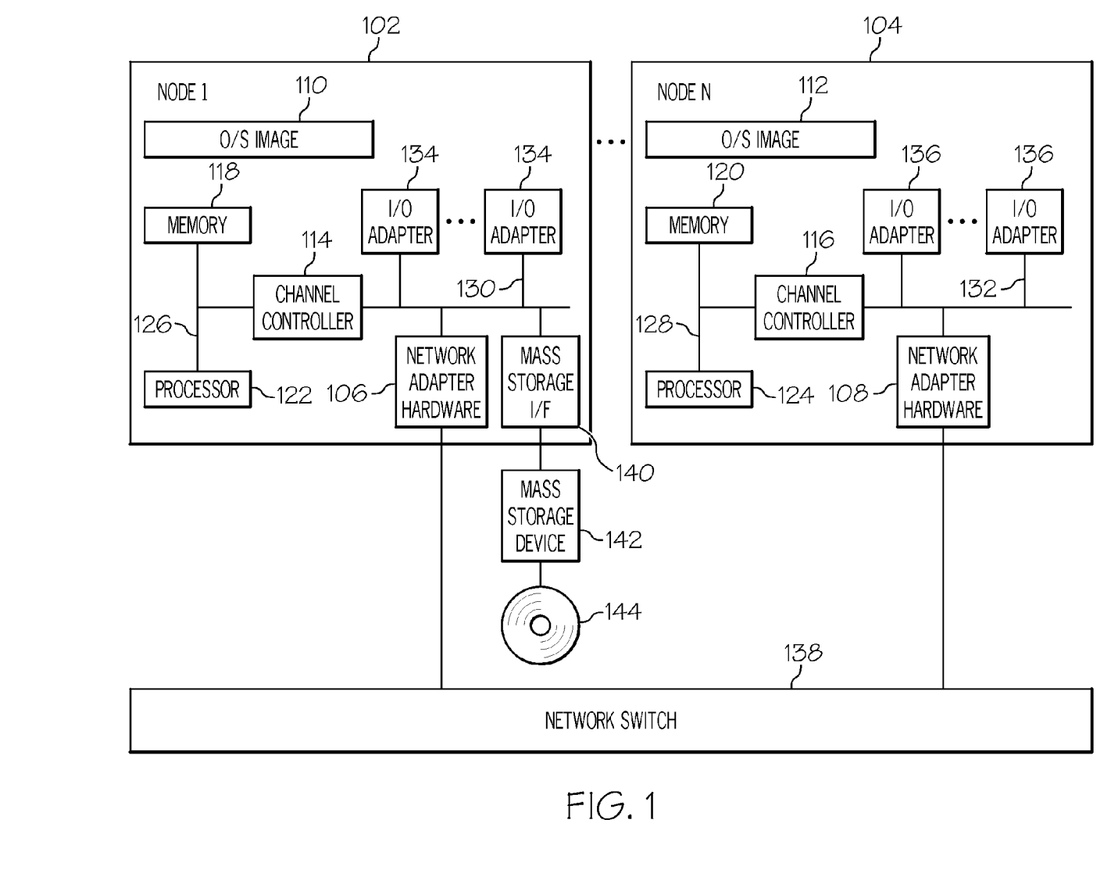
FIG. 1 illustrates one example of an operating environment according to one embodiment of the present invention.

FIG. 1 shows one example of an operating environment applicable to various embodiments of the present invention. In particular, FIG. 1 shows a parallel-distributed processing system in which one embodiment of the present invention is implemented. In this embodiment, the parallel-distributed processing system 100 operates in an SMP computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples I/O adapters 134 and 136 and network adapter 106 and 108. Although only one processor 122 and 124 is shown in each processing node 102 and 104 for simplicity, each processing node 102 and 104 can have more than one processor. The communication adapters are linked together via a network switch 138.

Also, one or more of the nodes 102, 104 comprises mass storage interface 140. The mass storage interface 140 is used to connect mass storage devices 142 to the node 102. One specific type of data storage device is a computer readable medium such as a Compact Disc ("CD") drive, which may be used to store data to and read data from a CD 144 or DVD. Another type of data storage device is a hard disk configured to support, for example, JFS type file system operations. In some embodiments, the various processing nodes 102 and 104 are able to be part of a processing cluster. It should be noted that the present invention is not limited to an SMP environment. Other architectures are applicable as well, and further embodiments of the present invention can also operate within a single system.

It should be noted that the above computing environment can be based on the z/Architecture® offered by International Business Machines Corporation (IBM®), Armonk, N.Y. The z/Architecture® is more fully described in: *z/Architecture® Principles of Operation*, IBM® Pub. No. SA22-7832-05, 6$^{th}$ Edition, (April 2007), which is incorporated by reference herein in its entirety. Computing environments based on the z/Architecture® include, for example, eServer and zSeries®, both by IBM®. However, other architectures are applicable as well.

Processor Core

Figure 2:
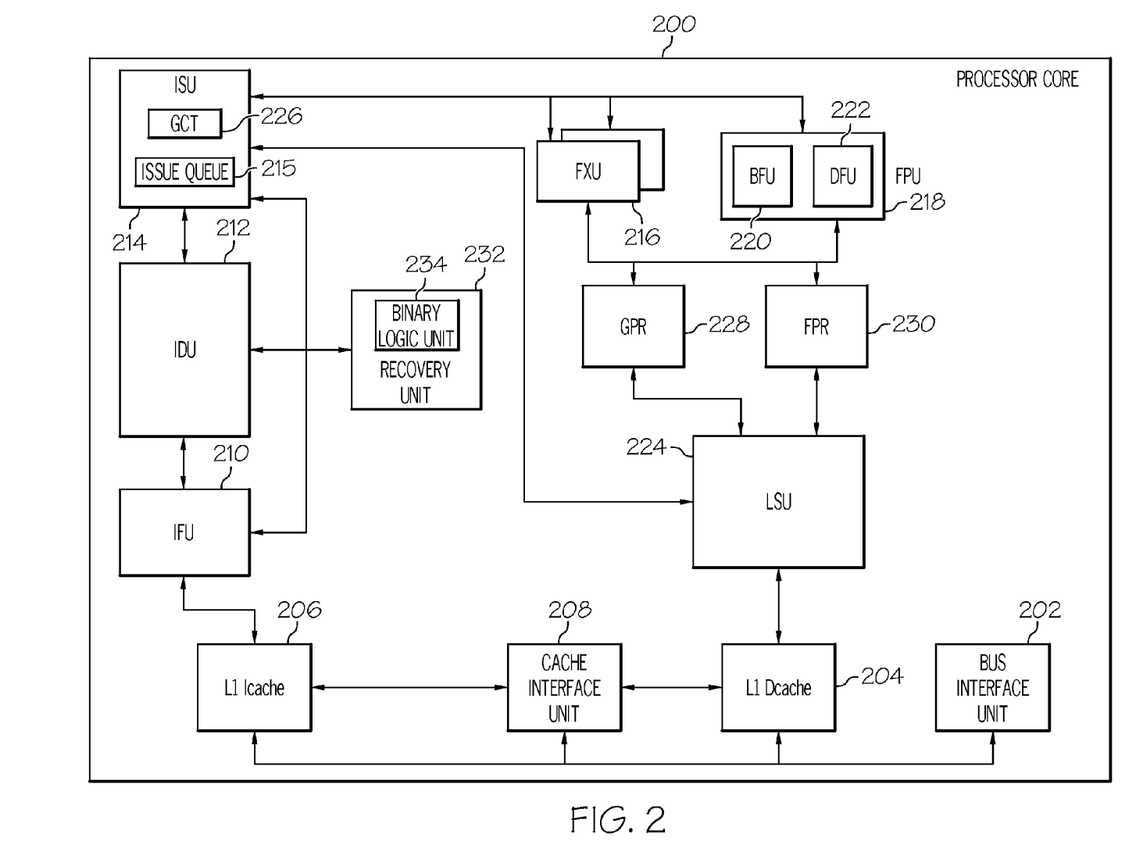
FIG. 2 illustrates a detailed view of a processing core according to one embodiment of the present invention.

According to one embodiment, FIG. 2 illustrates one example of a processor core 200 within a processor 122, 124 for out-of-order (OoO) millicode operation. It should be noted that the configuration shown in FIG. 2 is only one example applicable to the presently claimed invention. In particular, FIG. 2 shows a processing core 200. The processor core 200, in one embodiment, comprises a bus interface unit 202 that couples the processor core 200 to other processors and peripherals. The bus interface unit 202 also connects L1 Dcache 204, which reads and stores data values, L1 Icache 206, which reads program instructions, and a cache interface unit 208 to external memory, processor, and other devices.

The L1 Icache 206 provides loading of instruction streams in conjunction with an instruction fetch unit IFU 210. The IFU 210, in one embodiment, sorts instructions into groups. The IFU 210 also prefetches instructions and may include speculative loading and branch prediction capabilities. These fetched instruction codes are decoded by an instruction decode unit (IDU) 212 into instruction processing data. Once decoded, the instructions are dispatched to an instruction sequencer unit (ISU) 214 and saved in the Issue Queue (IQ) 215. The ISU 214 controls sequencing of instructions issued to various execution units such as one or more fixed point units (FXU) 216 for executing general operations and one or more floating point units (FPU) 218 for executing floating point operations. The floating point unit(s) 218 can be a binary point floating unit 220, a decimal point floating unit 222, and/or the like. It should be noted that the FUX(s) 216, in one embodiment, comprises multiple FXU pipelines, which are copies of each other.

The ISU 214 is also coupled to one or more load/store units (LSU) 224 via multiple LSU pipelines. These multiple LSU pipelines are treated as execution units for performing loads and stores and address generation for branches. Instructions stay in the issue queue waiting to be issued to the execution units depending on their age and on their dependencies. For example, instructions in the IQ 215 are examined to determine their dependencies and to see whether they can be issued. Upon determining which instructions or Uops (unit of operations) are ready for issue, the hardware selects the oldest instructions (Uops) among these instructions and then issues the selected instruction to execution units. The issue bandwidth depends on the number of execution available in the design.

A set of global (or group) completion tables (GCT) 226 residing within the ISU 214 track the instructions issued by ISU 214 via tags until the particular execution unit targeted by the instruction indicates the instructions have completed execution. In one embodiment, for each group of instructions, the ISU 214 creates an entry in the GCT 226. The ISU 214 uses the GCT 226 to manage completion of instructions within each outstanding group.

The FXU 216 and FPU 218 are coupled to various resources such as general-purpose registers (GPR) 228 and floating point registers (FPR) 230. The GPR 228 and FPR 230 provide data value storage for data values loaded and stored from the L1 Dcache 204 by a load store unit (LSU) 224. Each of the IFU 210, IDU 212, and ISU 214 are also communicatively coupled to one or more recovery units (RU) 232. The RU 232 comprises the entire architected state of the processor as well as the state of the internal controls of the processor. The RU 232 further comprises millicode control registers (MCRs), architected control registers for multiple levels of Start Interpretive Execution (SIE) guests, architected timing facilities for multiple levels of SIE guests, information concerning the processor state, and information on the system configuration. In addition, there are registers that control the hardware execution, and data buses for passing information from the processor to the other chips within the processing complex.

The RU 232 registers provide the primary interface between millicode (code internal to the central processor) and the processor hardware, and are used by millicode to control and monitor hardware operations. These special registers in the RU 232 are accessible to the millicode, and there are several unique milli-ops to access them, such as Read Special Register, Write Special Register, AND Special Register, OR Special Register, and logical immediate ANDs, ORs, and Inserts to various 2-byte fields of some of the RU 232 registers. Through these instructions millicode can, whenever current execution requires it, read or alter much of the state information of the processor. This can take place either during the execution of an instruction, which has to read or write specific state information, or during some other type of function, such as during the resetting of the processor or handling a recovery situation.

In one embodiment, the RU 232 also comprises a binary logic unit (BLU) 234 for bit manipulation. This allows for out-of-order millicode control operation by providing a built-in execution of MCR (millicode control register) control operation within the RU 232. By including a BLU 234 within the RU 232 latency is reduced and an FXU is not required for operation. Therefore, the RU 232 operates as an additional execution unit, which is able to perform operations parallel to operations being performed by the other execution units 216, 218, 224. The RU 232 and the out-of-order millicode control operation are discussed in greater detail below.

Out-of-Order Millicode Control Operation

As discussed above, complex instructions are generally required to be executed in millicode, which is the code internal to the central processor. Millicode resides in a protected area of storage referred to as the hardware system area, which is not accessible to the normal operating system or application program. Millicode is handled by the processor hardware similarly to the way operating system code is handled. Millicode accesses MCRs, which reside within the RU 232 and keep the check-pointed status for a potential recovery in case of an error.

The millicode is brought into the processor from system area storage and is buffered in the Icache 206. The IFU 210 fetches the millicode instructions from the cache, decodes them, calculates the operand addresses, fetches the operands, and sends them to an execution unit for the actual execution and the storage of the results. Millicode execution uses the same basic data flow as is used to execute system instructions.

When an instruction is encountered that must be executed by millicode, the normal processing of the system program instruction stream stops, and the instruction addresses of both the current system program instruction and the next sequential instruction are saved. Using the opcode of the instruction (in a modified format) as an index into the millicode section of the hardware system area, the appropriate millicode routine is fetched into the Icache 206. Each routine is given, for example, 128 bytes of contiguous storage before the next routine begins. If additional storage is required to complete the routine, the millicode will later branch to a unique location in system area storage that is defined for general use for millicode routines and has no size constraints.

Prior to execution of the first instruction of the millicode routine, setup is performed by the hardware to prepare for millicode execution. The actual instruction text is saved in a register for use by the millicode, if needed. If an address calculation is required for the operand of the system program instruction, the calculated address is placed in a millicode general register (GR), and the associated program access register (AR) is copied into the corresponding MCR. Some of the operand access control registers (OACRs) are initialized with the access key and addressing mode of the current program PSW (program status word), and some are set to the real addressing mode with an access key of zero. The register numbers of the relevant program GRs, based on the format of the system program instruction, are placed in the register indirect tags. For some instructions, flags are set to indicate particular facts about the instruction operands, such as page crossings, equal operand values, or operand values of zero. For a limited number of instructions, the actual operand contents are set directly into millicode GRs during this millicode entry process.

Once all of the appropriate hardware facilities have been set up, the millicode routine has enough information about the specific details of the instruction and its operands to start execution of the instruction. For many instructions, the hardware also checks some of the program interruption conditions that may be possible for the instruction (privileged operation exception, specification exception, etc.). The millicode routine is responsible for checking for any possible program interruption conditions that are not checked by the hardware, in the appropriate architectural order.

If no interruption conditions are detected, the millicode routine continues its processing, working on the data that was set up during millicode entry, fetching program GRs into its own GRs, reading data from the RU 232, and requesting data from storage. An instruction address register (other than the one that holds the saved operating system instruction address) is used to maintain the instruction address as the millicode routine executes. The routines can branch to other places within the same routine, branch to a different routine, or call a different routine as a subroutine, with the millicode instruction address register keeping track of which address to fetch and decode next.

As the millicode routine executes, architected facilities are updated with the calculated results. These facilities could be the program GRs, storage locations, or registers in the RU 232 that control future execution. When all of the operations for the instruction of the system program have been performed, and any condition code has been set, the millicode routine can stop processing. A milli-op, Millicode End (MCEND), is issued which alerts the hardware that this is the last instruction in this millicode routine. When this MCEND is decoded, the hardware stops fetching instructions from the millicode instruction address register and resumes fetching instructions from the "next sequential instruction address" register of the system program, which was saved on entry into the millicode routine. The hardware then begins decoding an instruction from the system program instruction stream, and either has the instruction directly executed by hardware, or returns to another millicode routine for its execution.

In conventional systems, MCRs are modified as follows. The MCR data is read within the RU and then transferred to the FXU. Binary logical operations are then performed in the arithmetic logic unit (ALU) of the FXU. The resulting data is then transferred to the RU and used to write the MCR data. Because the latency experienced with conventional MCR control operations is long, parallel or out-of-order execution with respect to millicode control operations is generally not possible in conventional systems. Also, some of the MCR data is needed during execution of normal operation. Therefore, local shadowing is required. For example, certain control registers may have local shadow copies within the instruction unit, execution unit, or other areas of the processor. A common BUS (CBUS) is used for updating the shadow copies. This CBUS is delivered from the RU 232, when writing an MCR, to update shadow copies outside of the RU 232. The CUBS needs to be in order, and therefore does not allow OoO execution.

However, one or more embodiments of the present invention allow for out-of-order millicode control operation. Millicode control operation occurs in the general execution of every millicode that accesses MCRs. The operations of an instruction that modifies an MCR are now internal within the RU 232, as compared to within the FXU of conventional systems. The RU 232, in one embodiment, performs the execution for all instructions that access MCRs.

Figure 3:
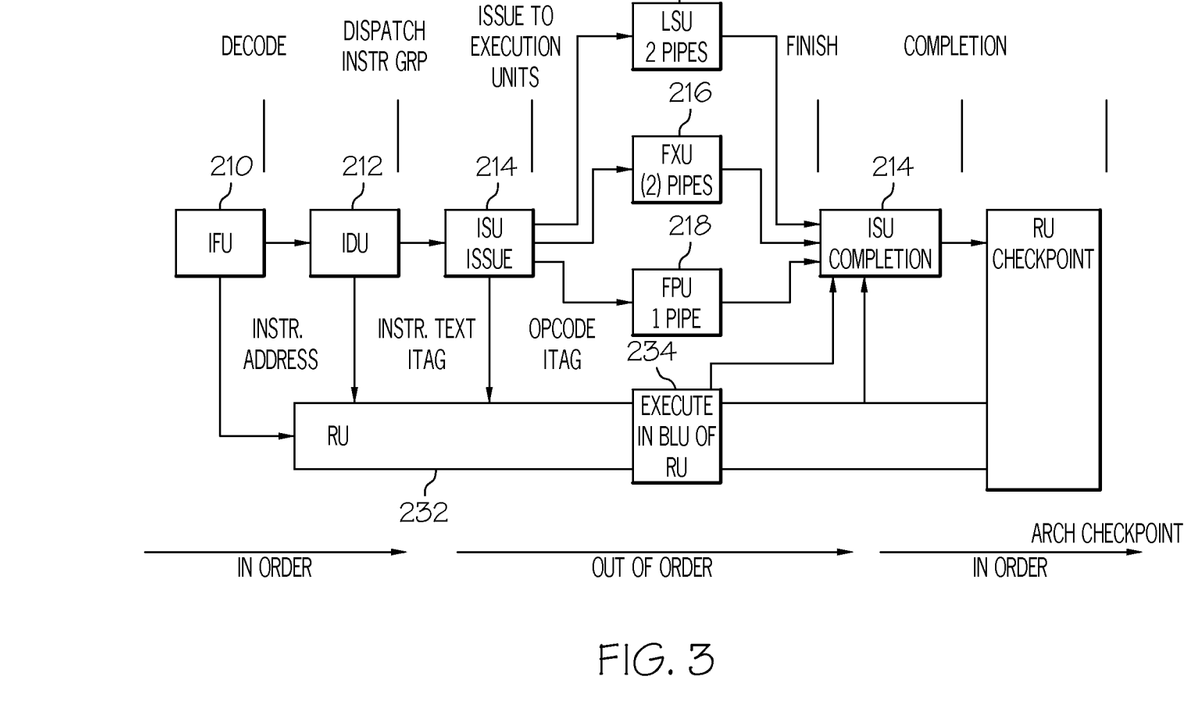
FIG. 3 illustrates one example of an execution pipeline for executing millicode control operations out-of-order according to one embodiment of the present invention.

FIG. 3 shows one example of an execution pipeline 300 for executing millicode control operations out-of-order according to one embodiment. As can be seen in FIG. 3, the IFU 210 fetches and sorts instructions into groups. The IFU 210 sends the instruction address of each instruction to the RU 232. A fetched instruction is then sent from the IFU 210 to the IDU 212, which decodes the instruction into instruction processing data. The IDU 212 sends the instruction text and an instruction tag (Itag) assigned to the instruction to the RU 232. An Itag indicates an age-wise location within the group of the instruction. Once decoded, the IDU 212 dispatches the instruction group to the ISU 214. The ISU 214 issues the instructions within a group to one or more execution units such as the FXU 216, FPU 218, LSU 224, and in one embodiment, the RU 232. It should be noted that up until the instructions are issued to an execution unit they remain in order. Then, as noted above, they can be issued out-of-order to one or more of the execution units including the RU 232.

Figure 4:
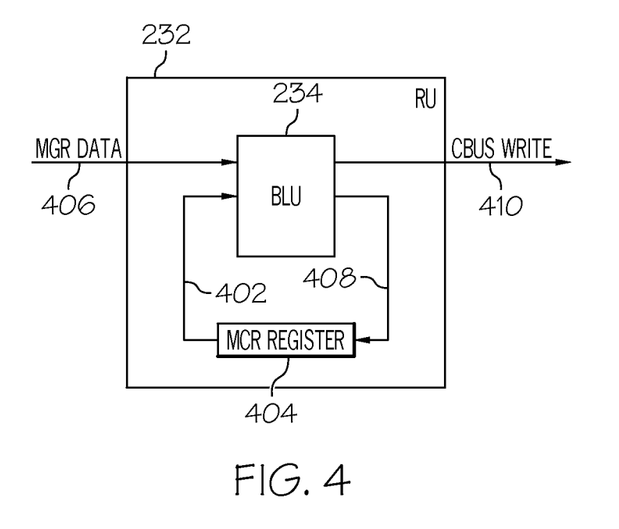
FIG. 4 illustrates one example of a datapath for modifying millicode control registers according to one embodiment of the present invention.

With respect to out-of-order issuing of instructions the RU 232, the RU 232 receives the operation code (opcode) for an instruction from the ISU 214 and performs an out of order execution of the instruction. MGR data is logically combined with MCR data and a logical operation in the BLU 234 of the RU 232 is performed thereon. For example, FIG. 4 shows one example of a datapath for modifying MCRs. As can be seen from FIG. 4, after the RU 232 receives the opcode for an out-of-order MCR modifying instruction from the ISU 214 the RU 232 reads MCR data 402 from an MCR 404 within the RU 232 and MGR data 406 from a corresponding MGR (not shown). Examples of out-of-order MCR modifying instructions include, but are not limited to, Or Special Register (OSR) instructions, And Special Register (NSR) instructions, and XOR Special Register (XSR) instructions.

One or more binary logical operations (AND, OR, XOR, Masking, etc.) are performed on the MCR data 402 and MGR data 406 by the BLU 234 within the RU 232. The resulting data 408 is written back to the MCR 404. The out-of-order execution requires a reordering of the MCR result data 408 written back to the MCR 404 after the BLU operations. This reordering, in one embodiment, is performed within an RU write queue (not shown) after the instruction has completed. The RU 232 can shadow the MCR data 408 on a single CBUS 410, where one MCR write instruction is allowed per group. However, more than one MCR write instruction per group can be allowed as well.

Returning to FIG. 3, once the instructions have written their data operand results into architected registers/control registers in the RU 232 they are finished. It should be noted that instructions that are grouped together and start executing at the same time do not necessarily finish executing at the same time. An instruction is said to "finish" when one of the execution units is done executing the instruction and reports back to ISU 214. An instruction is said to "complete" when the instruction is finishing executing in one of execution units has passed the point of flushing, and all older instructions have already been updated in the architected state, since instructions have to be completed in order. Hence, the instruction is now ready to complete and update the architected state (shown as RU checkpoint in FIG. 3), which means updating the final state of the data as the instruction has been completed. The architected state can only be updated in order, that is, instructions have to be completed in order and the completed data has to be updated as each instruction completes.

The RU checkpoint is used to maintain "checkpointed" results, which can be used to restore the state of the processor after detection of an error. "Checkpointed" means that at any given time, there is one copy of the registers that reflect the results at the completion of an instruction. When an error is encountered, all copies of the registers are restored to their checkpointed state, control is returned back to the point following the last instruction.

In addition to providing the out-of-order millicode control operation discussed above, one or more embodiments also provide a mechanism for determining and managing dependencies among out-of-order instructions executing within the RU 232. Generally, a dependency occurs where an instruction requires data from sources that are themselves the result of another instruction. For example, in the instruction sequence: ADD $8, $7, $5 SW $9, (0)$8, the ADD (add) instruction adds the contents of register $7 to the contents of register $5 and puts the result in register $8. The SW (store word) instruction stores the contents of register $9 at the memory location address found in $8. As such, the SW instruction must wait for the ADD instruction to complete before storing the contents of register $8. The SW instruction therefore has a dependency on the ADD instruction. The illustrated dependency is also known as a read-after-write (RAW) dependency.

Figure 5A:
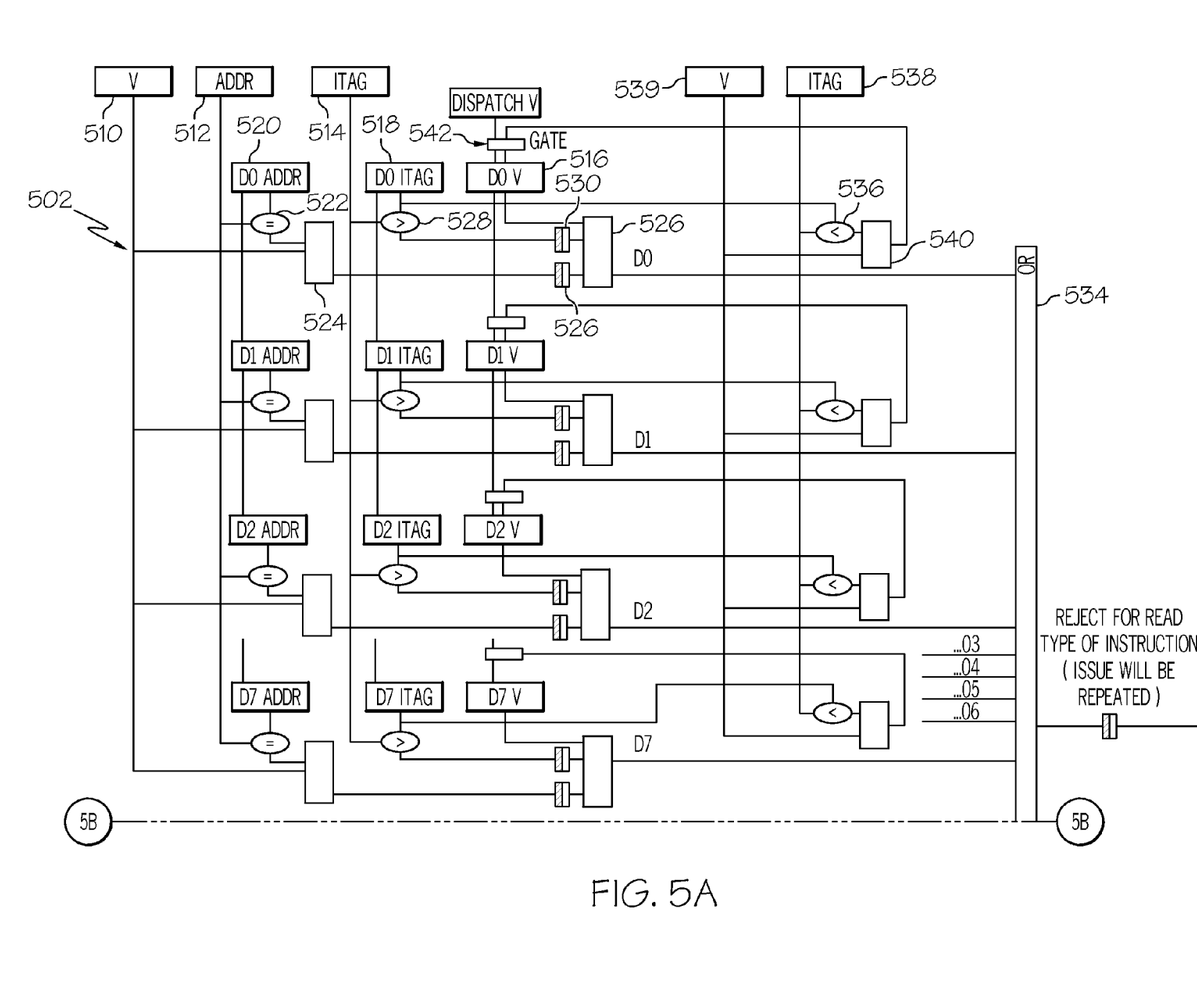
FIGS. 5A-5B illustrate one example of a mechanism for managing dependencies between out-of-order instructions executing within a recovery unit of a processor according to one embodiment of the present invention.
Figure 5B:
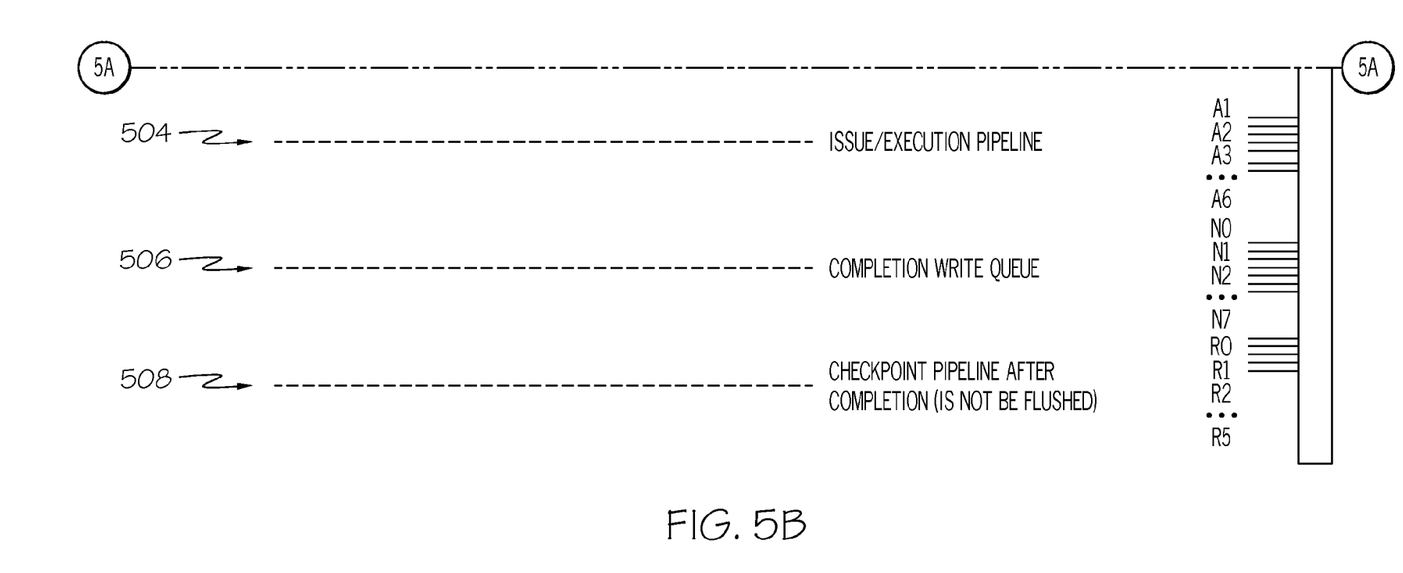

Therefore, the RU 232, in one embodiment, comprises one or more dependency managing mechanisms. FIGS. 5A-5B show one example of a dependency managing mechanism. In particular, FIGS. 5A-5B shows a schematic representing various pipeline stages. For example, FIGS. 5A-5B show a dispatch-to-issue-queue pipeline 502, an issue/execution pipeline 504, a completion-write-queue pipeline 506, and a checkpoint pipeline 508. In the example of FIGS. 5A-5B there are a total of 28 stages between the pipelines 502, 504, 506, 508. For example, the dispatch-to-issue-queue pipeline 502 comprises eight stages D0 to D7. The issue/execution pipeline 504 comprises 6 stages A1 to A6. The completion-write-queue pipeline 506 comprises 8 stages N0 to N7. The checkpoint pipeline 508 comprises 6 stages R1 to R6. FIG. 5A further shows a point in time where at each stage a write-type instruction is currently executing and a read type instruction has entered the given pipeline stage.

Beginning at the dispatch-to-issue-queue pipeline 502, a write-type instruction such as is currently executing within this pipeline stage 502. While the write-type instruction is executing a read-type instruction such as enters the pipeline stage 502. Examples of write-type instructions include, but are not limited to WSR (Write Special Pervasive) instructions, NSR (AND Special Pervasive) instructions, OAR (OR Special Pervasive) instructions, XOR (XOR Special Pervasive) instructions, and LCTL (Load Control Register) instructions. Examples of read-type instructions include, but are not limited to, RSR (Read Special Pervasive) instructions, NSR (AND Special Pervasive) instructions, OAR (OR Special Pervasive) instructions, XOR (XOR Special Pervasive) instructions, and STCTL (Store Control Register) instructions.

The read-type instruction is associated with an issue valid bit 510, an issue address 512, and an issue Itag. The write-type instruction is associated with a dispatch-to-issue queue valid bit 516, a dispatch-to-issue queue address 518, and a dispatch-to-issue queue Itag 520. A valid bit indicates when an according pipeline stage is still active. A valid bit can be initially set when an instruction is issued. Afterwards, the valid bit propagates through the pipeline. When the valid bit is set to equal to "0" the address tag and Itag are ignored. Also, the valid can be dropped by a Flush operation. The Itag indicates an age-wise location within the corresponding group of instructions. As discussed above, the dispatch-to-issue-queue pipeline 502 comprises 8 stages D0 to D7. Therefore, a dispatch-to-issue queue valid bit 516, a dispatch-to-issue queue valid bit, and a dispatch-to-issue queue Itag 520 exist for each of these stages D0, D1, D2, . . . , D7.

Instruction address comparison logic 522 is utilized by the RU 232 to determine if the instruction addresses 512, 518 of the read-type instruction and the write-type instruction match. If these instruction addresses 512, 518 do not match a dependency does not exist and the instructions continue executing in the pipeline stage 502. If, however, the instruction addresses 512, 518 match, the RU 232 compares the Itags 514, 520 of each of these instructions using Itag comparison logic 528. This Itag comparison process is performed to determine if the Itag 514 of the read-type instruction is greater than the Itag 520 of the write-type instruction. As discussed above, an Itag indicates an age-wise location within the corresponding group of instructions. Therefore, if the Itag 514 of the read-type instruction is greater than the Itag 520 of the write-type instruction, the read-type instruction is younger than the write-type instruction and a dependency exists between the instructions. Otherwise a dependency does not exist and the instructions are allowed to continue their execution within the pipeline stage 502. If the read-type instruction is determined to be younger than the write-type instruction then the RU 232 rejects the read-type instruction. This causes the read-type instruction to be reissued.

For example, the output of the instruction comparison logic 522 and the valid bit 510 of the read-type instruction are coupled to the inputs of a first AND gate 524. The output of the first AND gate 524 is used as an input to a first latch 526. The output of the Itag comparison logic 528 is coupled to an input for a second latch 530. The latches 526, 530 separate the logic of the various pipeline stages. It should be noted that other components shown in the schematic of FIG. 5 can also comprises latches/registers for separating pipeline stages as well. The outputs of first and second latches 526, 530 are coupled to the input of a second AND gate 532. The output of the second AND gate 532 is coupled to the input of an OR gate 534, which (in this example) is a logical OR gate from 28 input stages. Therefore, when the instruction addresses 512, 518 match the instruction comparison logic 522 outputs a value to the first AND gate 524.

When the valid bit 510 of the read-type instruction is also high, this results in the first AND gate 524 outputting a high bit to the second AND gate 532. Then, when the Itags match 514, 520 the Itag comparison logic 528 also outputs a high bit to the second AND gate 532. The two high bits from the instruction address comparison logic 522 and the Itag comparison logic 528 result in the second AND gate 532 outputting a high bit to the OR gate 524, which triggers a rejection of the read-type instruction. It should be noted that the above dependency management process is also performed for each of the remaining pipeline stages of the dispatch-to-issue-queue pipeline 502 and also for each stage of the issue/execution pipeline 504, the completion-write-queue pipeline 506, and the checkpoint pipeline 508.

In addition, FIG. 5A also illustrates a mechanism for flushing the pipeline in case of, for example, a branch misprediction (or any other situation requiring a pipeline flush). This mechanism allows for only instructions that are younger than the branch misprediction instruction to be flushed, as compared to flushing the entire pipeline. In particular, the RU 232 utilizes additional Itag comparison logic 538 to compare the Itag 520 of the write-type instruction to an Itag 536 associated with a branch misprediction instruction. If the Itag comparison logic 538 indicates that the Itag 520 of the write-type instruction is less than the Itag 536 of the branch misprediction instruction, then the write-type instruction is older than the branch misprediction instruction and is not flushed. However, if the Itag comparison logic 538 indicates that the Itag 520 of the write-type instruction is greater than the Itag 536 of the branch misprediction instruction, then the write-type instruction is younger than the branch misprediction instruction and is flushed.

For example, the output of Itag comparison logic 538 and the valid bit 539 of the branch misprediction instruction are coupled to an input of a third AND gate 540. When the Itag 520 of the write-type instruction is greater than the Itag 538 of the branch misprediction instruction the Itag comparison logic 536 outputs a low bit to the third AND gate 540. Therefore, the third AND gate 540 is receiving a high bit from the branch misprediction instruction and a low bit from the Itag comparison logic 536. This results in a low bit being outputted from the third AND gate 540 to the valid bit 516 of the write-type instruction, which can be gated resulting in the valid bit 516 of the write-type instruction being set to a low bit. Therefore, the second AND gate 532 is receiving a high bit from the first AND gate 524 and the Itag comparison logic 528, and a low bit from the bit 516 of the write-type instruction. This results in a flushing of the pipeline.

Stated differently, when the valid bit 539 of the branch misprediction instruction is active (=1) and the Itag 538 of the branch misprediction instruction is smaller than the Itag 518 of the write-type instruction of the current stage, the valid bit 516 of the write-type instruction is invalidated (or gated 542). The comparator 536 compares the Itag 538 of the branch misprediction instruction with the Itag 518 of the write-type instruction of the current stage. If the Itag 538 of the branch misprediction instruction is smaller (i.e., younger) than the Itag 518 of the write-type instruction, the Itag 538 of the branch misprediction instruction is invalidated (e.g., the input to 516 is forced to "0"). It should be noted that the above process for flushing the pipeline is also performed for each stage of the issue/execution pipeline 504 (FIG. 5B) and completion-write-queue pipeline 506 (FIG. 5B) as well.

As can be seen from the above discussion, one or more embodiments of the present invention allow for out-of-order execution of MCR control operations within the RU. By including a BLU within the RU, latency is reduced and an FXU is not required for operation. Therefore, the RU operates as an additional execution unit, which is able to perform operations parallel to operations being performed by the other execution units. The operations of an instruction that modifies an MCR are now internal within the RU, as compared to within the FXU of conventional systems. The RU, in one embodiment, performs the execution for all instructions that access MCRs. Also, shadowing can be performed with a CBUS driven from the RU. Another advantage is that the RU is able to resolve potential conflict by providing a mechanism for managing dependencies.

Operational Flow Diagram

Figure 6:
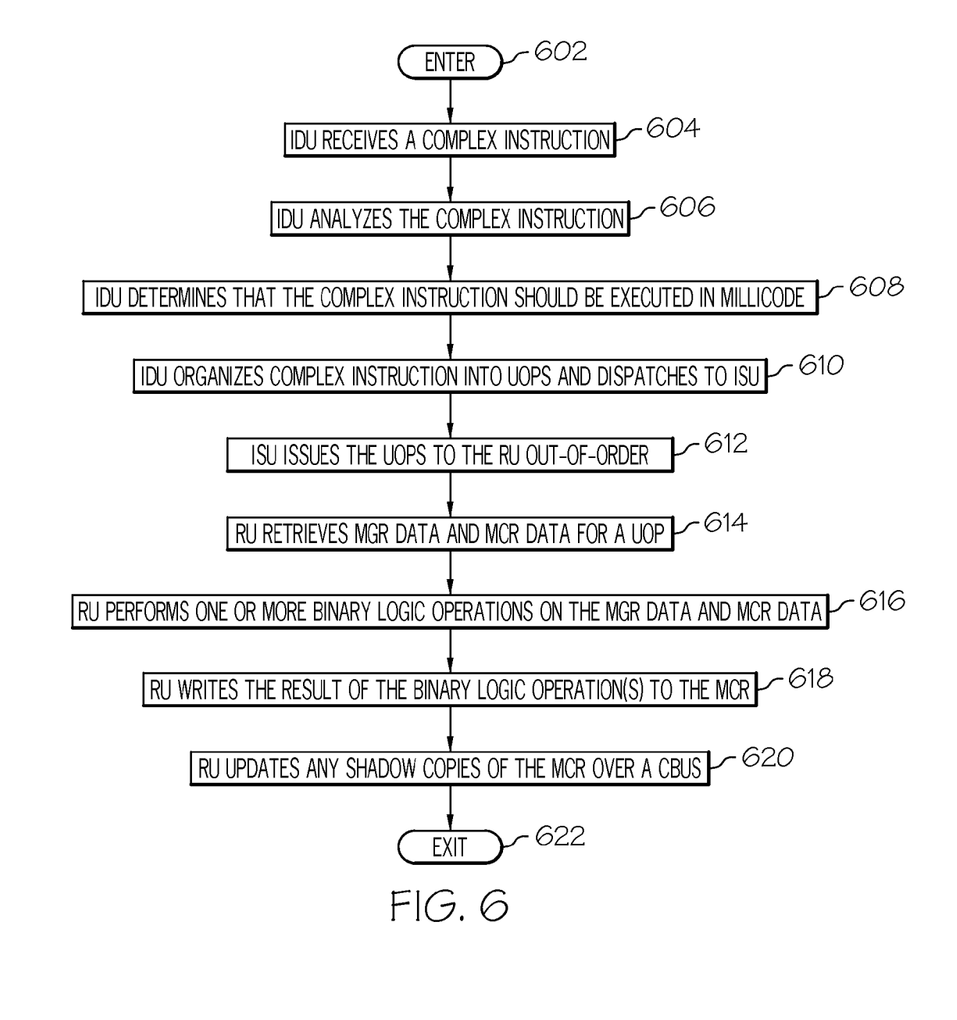
FIG. 6 is an operational flow diagram illustrating one example of a process for of managing out-of-order complex instructions according to one embodiment of the present invention.

FIG. 6 is an operational flow diagram illustrating one example of managing out-of-order complex instructions. The operational flow diagram of FIG. 6 begins at step 602 and flows directly into step 604. The IDU 212, at step 604, receives a complex instruction. The IDU 212, at step 606, analyzes the complex instruction. The IDU 212, at step 608, determines that the complex instruction should be forced to millicode based on the analyzing. The IDU 212, at step 610, organizes the complex instruction into Uops that represent millicode entry sequence and dispatches the Uops to the ISU 214. The ISU 214, at step 612, issues the Uops to the RU 232 out-of-order.

The RU 232, at step 614, retrieves MGR data associated with a Uop from an MGR and MCR data associated with the Uop from an MCR within the RU 232. One or more binary logic operations, at step 616, at performed on the MGR data and MCR data within a BLU 234 of the RU 232. The RU 232, at step 618, writes the binary logic operation to the MCR. Any shadow copies of the MCR, at step 620, are update via a CBUS. The control flow then exits at step 622.

Figure 7:
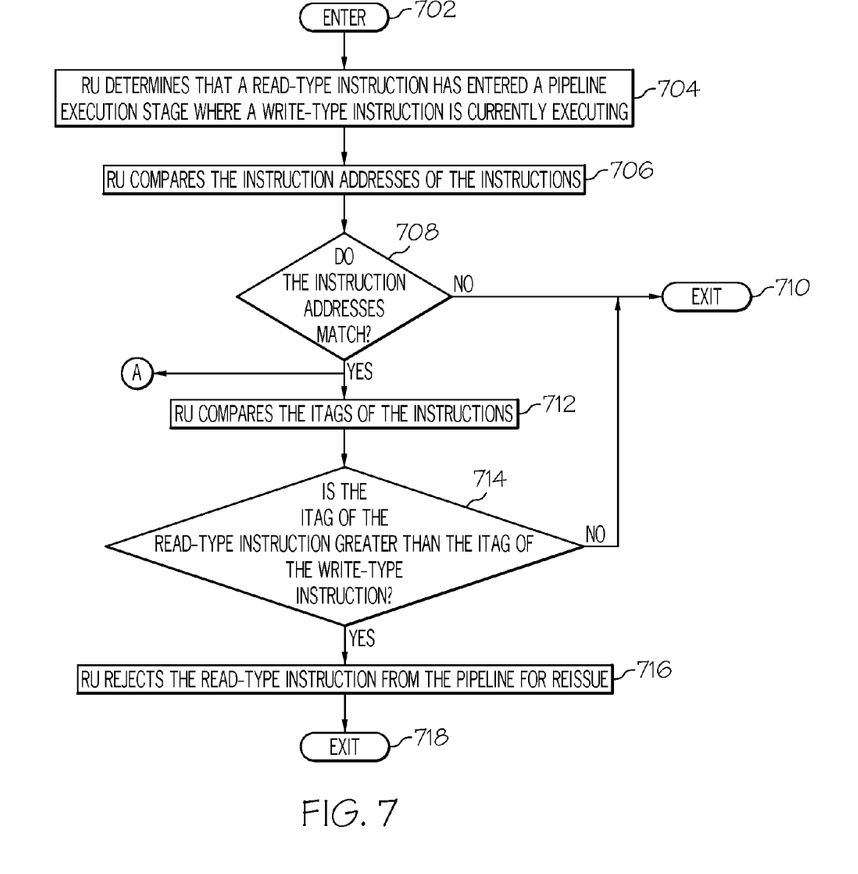
FIG. 7 is an operational flow diagram illustrating one example of managing dependencies of instructions executing within a recovery unit of a processor according to one embodiment of the present invention.

FIG. 7 is an operational flow diagram illustrating one example of managing dependencies of instructions executing within the RU 232. The operational flow diagram of FIG. 7 begins at step 702 and flows directly into step 704. The RU 232, at step 704, determines that a read-type instruction has entered an execution pipeline stage where a write-type instruction is currently executing. The RU 232, at step 706, compares the instruction address 512 of the read-type instruction with the instruction address 518 of the write-type instruction. The RU 232, at step 708, determines if the instruction addresses 512, 518 match. If the result of this determination is negative, the control flow exits at step 710. If the result of this determination is positive, the RU 232, at step 712, compares the Itags 514, 520 of each instruction.

The RU 232, at step 714, determines if the Itag 514 of the read-type instruction is greater than the Itag 520 of the write-type instruction. If the result of this determination is negative, the control flow exits at step 710. If the result of this determination is positive, the RU 232, at step 716, determines that the read-type instruction is younger than the write-type instruction and rejects the read-type instruction from the pipeline for reissue. The control flow then exits at step 718.

Figure 8:
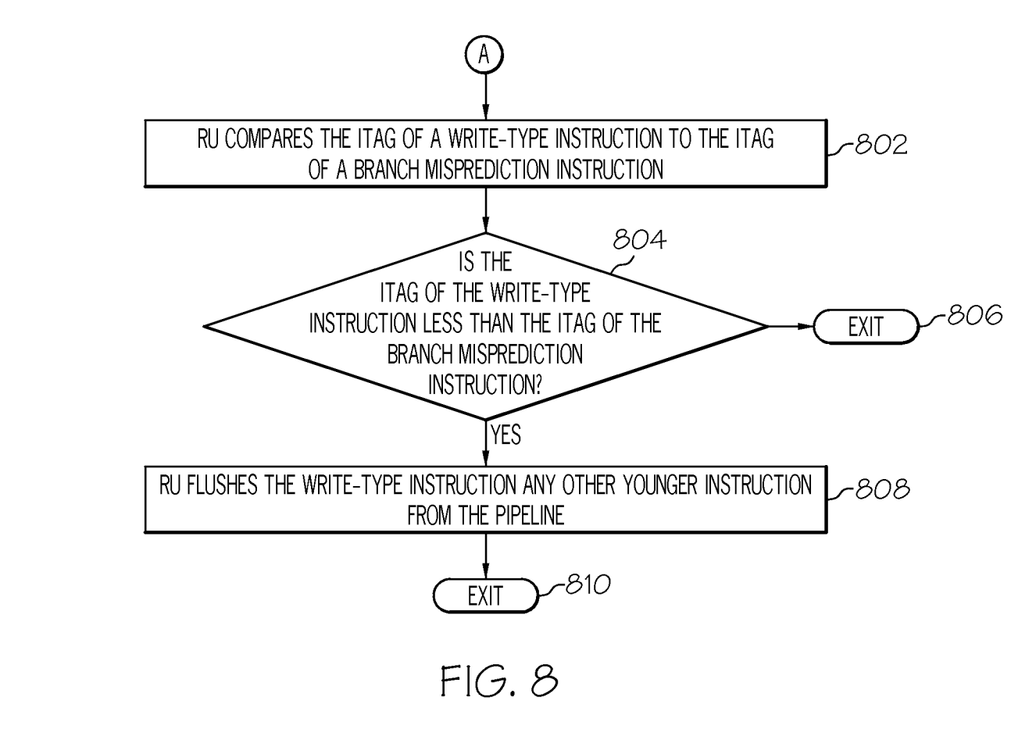
FIG. 8 is an operational flow diagram illustrating one example of detecting a flush condition within the execution pipeline of recovery unit of a processor according to one embodiment of the present invention.

FIG. 8 is an operational flow diagram illustrating one example of detecting a flush condition within the execution pipeline of the RU 232. The operational flow diagram of FIG. 7 can begin and be performed in parallel with step 712 of FIG. 7. The RU 232, at step 802, compares the Itag 520 of the write-type instruction to an Itag 536 of a branch misprediction instruction. The RU 232, at step 804, determines if the Itag 520 of the write-type instruction is less than the Itag 536 of the branch misprediction instruction. If the result of this determination is positive, the control flow exits at step 806. If the result of this determination is negative, the RU 232 determines that the Itag 520 of the write-type instruction is greater (i.e., the write-type instruction is younger) than the Itag 536 of the branch misprediction instruction. The RU 232, at step 808, then flushes the write-type instruction and the other younger instructions from the pipeline. The control flow then exits at step 810.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD, CD ROM, or other form of recordable media, or via any type of electronic transmission mechanism.

What is claimed is:

1. A method for managing instructions within a processor, the method comprising:
    receiving, at a recovery unit of a processor, an instruction that modifies a control register residing within the recovery unit, wherein the instruction is one of a plurality of instructions representing a millicode entry sequence for a complex instruction;
    retrieving, by the recovery unit, a first set of data associated with the instruction from a general register;
    retrieving, by the recovery unit, a second set of data associated with the instruction from the control register; and
    performing, by the recovery unit, at least one binary logic operation on the first set of data and the second data.

2. The method of claim 1, further comprising:
    writing a third set of data resulting from the performing the binary logic operation that to the control register.

3. The method of claim 2, further comprising:
    reordering the third set of data within a write queue of the recovery unit.

4. The method of claim 1, further comprising:
    updating, by the recovery unit, at least one shadow copy of the control register over a common bus.

5. The method of claim 1, further comprising:
    logically combining, prior to the performing, the first set of data and the second set of data.

6. The method of claim 1, further comprising:
    comparing, by the recovery unit based on receiving the instruction, a first instruction address of the instruction with a second instruction address of a currently executing instruction;
    determining, by the recovery unit, that the first instruction address and the second instruction address match;
    comparing, by the recovery unit based on the determining, a first instruction tag associated with the instruction with a second instruction tag associated with the currently executing instruction;
    determining, by the recovery unit based on comparing the first instruction tag with the second instruction tag, that the first instruction tag is greater than the second instruction tag; and
    identifying, by the recovery unit based on the first instruction tag being greater than the second instruction tag, the instruction being dependent on the current executing instruction.

7. The method of claim 6, further comprising:
    preventing, based on the identifying, the instruction from executing.

8. The method of claim 1, further comprising:
    comparing, by the recovery unit based on receiving the instruction, a first instruction tag associated with an instruction currently executing within an execution pipeline of the recovery unit with a second instruction tag associated with a branch misprediction instruction;
    determining, by the recovery unit based on comparing the first instruction tag with the second instruction tag, that the first instruction tag is greater than the second instruction tag; and
    flushing, by the recovery unit, at least the currently executing instruction from the execution pipeline.

9. An information processing system comprising a recovery unit for managing instructions within a processor, the information processing system comprising:
    memory; and
    a processor communicatively coupled to the memory, the processor comprising a recovery unit configured to perform a method comprising:
        receiving an instruction that modifies a control register residing within the recovery unit, wherein the instruction is an out-of-order instruction representing a millicode entry sequence for a complex instruction;
        retrieving a first set of data associated with the instruction from a general register;
        retrieving a second set of data associated with the instruction from the control register; and
        performing at least one binary logic operation on the first set of data and the second data, wherein the at least one binary logic operation is performed in parallel with at least one additional operation being performed on at least one or more instructions by at least one execution unit of the processor.

10. The information processing system of claim 9, the method further comprising:
   comparing, based on receiving the instruction, a first instruction address of the instruction with a second instruction address of a currently executing instruction;
   determining that the first instruction address and the second instruction address match;
   comparing, by the recovery unit based on the determining, a first instruction tag associated with the instruction with a second instruction tag associated with the currently executing instruction;
   determining, based on comparing the first instruction tag with the second instruction tag, that the first instruction tag is greater than the second instruction tag; and
   identifying, based on the first instruction tag being greater than the second instruction tag, the instruction being dependent on the current executing instruction.

11. The information processing system of claim 10, the method further comprising;
   writing a third set of data resulting from the performing the binary logic operation that to the control register; and
   reordering the third set of data within a write queue of the recovery unit.

12. The information processing system of claim 10, the method further comprising:
   updating at least one shadow copy of the control register over a common bus.

13. The information processing system of claim 10, the method further comprising:
   preventing, based on the identifying, the instruction from executing.

14. The information processing system of claim 10, the method further comprising:
   comparing, based on receiving the instruction, a first instruction tag associated with an instruction currently executing within an execution pipeline of the recovery unit with a second instruction tag associated with a branch misprediction instruction;
   determining, based on comparing the first instruction tag with the second instruction tag, that the first instruction tag is greater than the second instruction tag; and
   flushing at least the currently executing instruction from the execution pipeline.

15. A computer program product for managing instructions within a processor, the computer program product comprising:
   a non-transitory storage medium readable by a processing circuit and storing instructions for execution by the processing circuit for performing a method comprising:
   receiving an instruction that modifies a control register residing within a recovery unit of a processor, wherein the instruction is an out-of-order instruction representing a millicode entry sequence for a complex instruction;
   retrieving a first set of data associated with the instruction from a general register;
   retrieving a second set of data associated with the instruction from the control register; and
   performing at least one binary logic operation on the first set of data and the second data.

16. The computer program product of claim 15, the method further comprising;
   writing a third set of data resulting from the performing the binary logic operation that to the control register; and
   reordering the third set of data within a write queue of the recovery unit.

17. The computer program product of claim 15, the method further comprising:
   updating at least one shadow copy of the control register over a common bus.

18. The computer program product of claim 15, the method further comprising:
   comparing, based on receiving the instruction, a first instruction address of the instruction with a second instruction address of a currently executing instruction;
   determining that the first instruction address and the second instruction address match;
   comparing, by the recovery unit based on the determining, a first instruction tag associated with the instruction with a second instruction tag associated with the currently executing instruction;
   determining, based on comparing the first instruction tag with the second instruction tag, that the first instruction tag is greater than the second instruction tag; and
   identifying, based on the first instruction tag being greater than the second instruction tag, the instruction being dependent on the current executing instruction.

19. The computer program product of claim 18, the method further comprising:
   preventing, based on the identifying, the instruction from executing.

20. The computer program product of claim 15, the method further comprising:
   comparing, based on receiving the instruction, a first instruction tag associated with an instruction currently executing within an execution pipeline of the recovery unit with a second instruction tag associated with a branch misprediction instruction;
   determining, based on comparing the first instruction tag with the second instruction tag, that the first instruction tag is greater than the second instruction tag; and
   flushing at least the currently executing instruction from the execution pipeline.

* * * * *